United States Patent
Angold

[15] 3,667,613
[45] June 6, 1972

[54] APPARATUS FOR FILTERING COOKING LIQUID

[72] Inventor: Raymond H. Angold, 179 Fairway Hill Crescent, Kingston, Ontario, Canada

[22] Filed: Oct. 2, 1970

[21] Appl. No.: 77,592

Related U.S. Application Data

[63] Continuation-in-part of Ser. No. 716,437, Mar. 27, 1968, abandoned.

[52] U.S. Cl..............................210/336, 210/167, 210/338, 210/342
[51] Int. Cl........................................B01d 25/36
[58] Field of Search..................210/380, 336, 324, 326, 376, 210/167, DIG. 8, 338, 342

[56] References Cited

UNITED STATES PATENTS

| | | | |
|---|---|---|---|
| 2,732,073 | 1/1956 | Ruegg | 210/380 X |
| 2,991,887 | 7/1961 | Wirth et al. | 210/376 |
| 3,085,690 | 4/1963 | May | 210/307 |

*Primary Examiner*—J. L. DeCesare
*Attorney*—Stevens, Davis, Miller & Mosher

[57] ABSTRACT

A filter assembly for use in apparatus for cooking food in a hot cooking liquid, in which the filter assembly is rotated to centrifugally clean the filter medium. The filter assembly is particularly suitable for continuously filtering uncooked and partly cooked foodstuffs from the cooking liquid, and is supported with a cooperating impervious tube spaced therefrom to form a receiving chamber for filtered liquid. The chamber is connected to a conduit for conveying the filtered liquid, for example, back to a supply reservoir for re-use. The filter medium is one of a cloth woven from strands or fibers of a fluorinated ethylene or propylene resin, a silicone-based thermosetting resin or like substance having similar non-stick and low friction characteristics; strands or fibers of the materials mentioned above pressed together into a felt-like mat structure; or a wire screen whose wire strands are substantially wholly coated, preferably with tetrafluorethylene, or another of the above resins. The filter assembly includes means for rotatably mounting the same in a housing. Preferably, at least one turbulence-generating bar or like structure is provided adjacent the filter surface. This bar creates turbulence in the liquid when the filter assembly is being rotated, and that turbulence tends to loosen filtered material deposited on the filter surface and effects an auxiliary cleansing action on said surface. At least one filter and impervious surface arrangement is provided. Some back flushing also occurs when the filter assembly is cleaned.

16 Claims, 5 Drawing Figures

FIG.2

APPARATUS FOR FILTERING COOKING LIQUID

This application is a continuation-in-part application based on U.S. Ser. No. 716,437 filed Mar. 27, 1968 that is now abandoned.

This invention relates to a filter assembly of the type which can be rotated and cleaned centrifugally. More particularly, the present invention relates to a filter assembly that is adapted to be used in an apparatus and process for cooking food, especially a process for pressure-cooking chicken, fish, or the like in a hot cooking liquid, wherein cooked, partially cooked or uncooked foodstuffs are to be removed continuously from the cooking liquid.

BACKGROUND OF THE INVENTION

In recent years, there has been a substantial increase in the popularity of preparing foods by cooking, particularly, in a cooking liquid such as hot fat or oil, in a cooking chamber under pressure in excess of normal atmospheric pressure. This stems in part from the fact that the eating qualities of foods such as chicken cooked that way is greatly enhanced. A problem, however, which is almost always encountered and is particularly important in commercial eating establishments, is that of maintaining the cooking fat or oil clean and of a high quality. It is well known for instance that in preparing pieces of chicken for pressure cooking in hot fat, the chicken is initially in a flour laden with spices; or breadcrumbs; or a similar foodstuff. During the cooking operation and particularly during the handling of such food, some of the flour, spices, or even particles of raw chicken may fall off. This residue is usually carried away in the hot fat or oil. Since the fat or oil is heated to a temperature in the range of approximately 250° to 400° F. (in order to cook the chicken, etc.) the contaminating flour, spices, or other particulate material in the hot fat subsequently becomes baked or burned onto the filter surface quite quickly, especially if they were partly cooked or uncooked initially. As a result the filter medium rapidly becomes plugged and rendered inoperative. In addition, unless removed, these contaminating materials lead rapidly to a deterioration in the quality and purity of the cooking oil or fat.

Examples of some known arrangements for cooking food as above described are disclosed in U.S. Pat. Nos. 2,778,736 and 2,914,063 (both to Wagner) issued Jan. 22, 1957 and Nov. 24, 1959 respectively. Another arrangement is described in Canadian Pat. No. 595,464 (Sanders) issued on Apr. 5, 1960. In each of the systems described in those patents, however, there has remained unsolved the difficult problem of how to maintain the quality of the cooking liquid at a high level, particularly as applied to processes of cooking large volumes of food wherein the contaminating foodstuff material must continuously be removed from the cooking liquid. It will be recognized by those familiar with this art that although various attempts have previously been made to solve this problem, no suitable apparatus is known whereby partly cooked or uncooked foodstuffs can be continuously filtered from hot cooking oil or fat while still permitting easy cleaning and re-use of the filter medium. Cloth and paper filters which have been used in the past for filtering cooked particles have soon been rendered inoperative when filtering uncooked foodstuffs, because such foodstuff quickly bakes firmly onto the filter. In those circumstances, cleaning of the filter for re-use was virtually impossible without physically destroying, or at least seriously damaging the cloth or paper filter.

SUMMARY OF THE INVENTION

The present invention overcomes many of the prior art problems associated with keeping hot cooking liquid adequately clean and pure for continued re-use. In particular, the present invention provides an improved filter assembly, i.e., apparatus that is highly successful in continuously removing contaminating material such as cooked foodstuffs, and especially partially cooked or uncooked foodstuffs from hot cooking liquid such as fat or oil. Such liquids are particularly susceptible to a rapid deterioration in quality if not kept sufficiently clean and pure by the removal of the contaminating material. This can be a particularly important factor in efficiently and successfully operating process for cooking large volumes of food in hot fat or oil.

It is an object herein, therefore, to provide a filter assembly which is rotatably mounted in order to be easily cleaned by centrifugal forces generated by the rotation of that apparatus. A longer working life of the filter medium is obtained since the use of any scrapers or the like has been eliminated, thus avoiding excessive wear or scratching of the filter surfaces.

An object of a preferred form of the present invention is to provide structure for generating turbulence in the cooking liquid immediately adjacent the filter medium when the filter assembly is being rotated, to effect an auxiliary cleansing action on the filter surface.

These objects together with other features to be described below can be realized in filter apparatus adapted to remove contaminating material from hot cooking liquid in a system of cooking food, comprising: a filter medium disposed symmetrically about an axis of rotation and being operable to filter said contaminating material from the cooking liquid; surface means impervious to said liquid spaced inwardly of the filter medium relative to said axis, and cooperating therewith to form a receiving chamber for the filtered liquid; support elements for supporting the filter medium and impervious surface means in spaced apart relation; conduit means operatively associated with said support elements for conveying the filtered liquid from the receiving chamber; and support means including bearing means, for rotatably supporting the support elements, filter medium and impervious surface means, the support means being adapted to be selectively driven for rotating the filter medium about said axis, such rotation enabling centrifugal forces to be developed which cause the contaminating material to be cleaned from the filter medium, and the latter left undisturbed.

In order to understand the present invention more fully, reference should now be made to the accompanying drawings. These drawings are illustrative and refer by way of example only, to one process for cooking food in a hot cooking liquid, namely: pressure cooking under pressures greater that atmospheric pressure.

DESCRIPTION OF THE PREFERRED EMBODIMENTS

Figure 1:
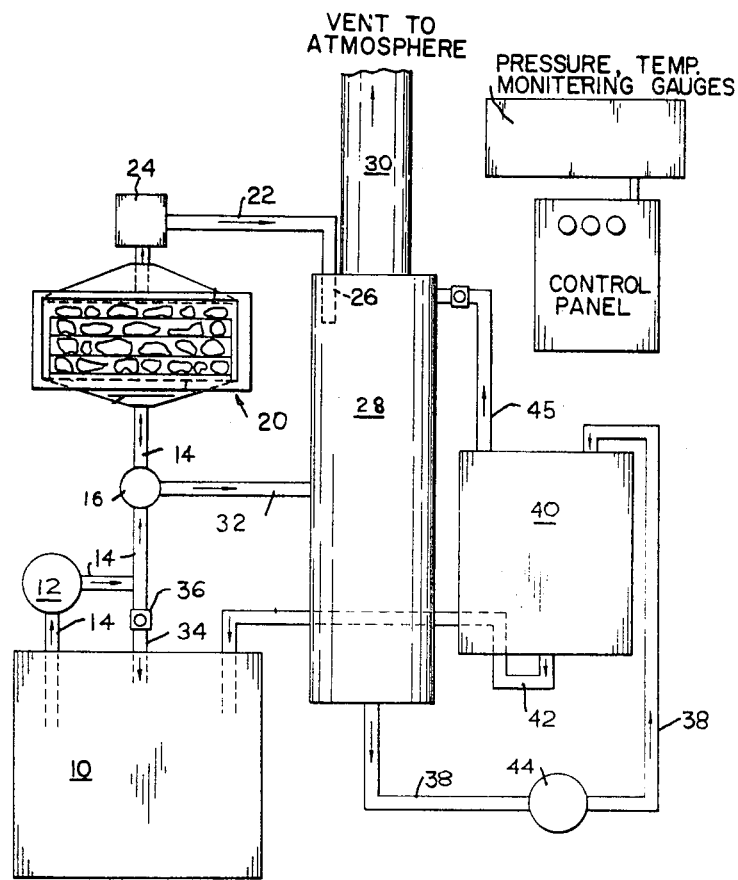
FIG. 1 is a schematic view showing one embodiment of a cooking apparatus utilizing the present invention.

Turning now to the drawings, FIG. 1 illustrates an apparatus which is suitable for cooking food by pressure cooking under a pressure in excess of normal atmospheric pressure. This pressure can be, for example, from 10 to 20 psig. Here, the cooking takes place in hot cooking fat or oil heated initially to approximately 300° to 400° F. in a fat fryer 10, of conventional design. The hot cooking oil is then pumped by means of a suitable pump 12 through conduit 14 and a multi-way adjustable control valve 16 to a pressurizeable cooking chamber 20. It should be noted that cooking chamber 20 is preferably of a side-loading type which permits loading of the food to be cooked into the dry, i.e., drained-out cooking chamber. Such a cooking chamber will minimize the common hazards arising from possible splashing or spilling over of hot cooking oil whenever food is being placed into, or being removed from the chamber. The pump 12 is also of conventional design, for instance, a gear-type pump and for convenience is driven by means of an electric motor (not shown). Other equivalent and suitable forms of motive power may also be used to drive the pump 12. The adjustable control valve 16 is preferably located in the conduit leading to the bottom of the pressurizeable cooking chamber 20. Furthermore, the adjustable control valve 16 is conveniently of a construction similar to a compound check valve. In a preferred form, the control valve 16 is a multi-purpose valve such as that shown and described in my copending U.S. C-I-P application, Ser. No. 58,951 filed July 28, 1970. That valve 16 functions in response to the pressure generated by the pump 12 to control the filling of the cooking chamber 20 with cooking oil, to circulate the cooking oil throughout the cooking chamber, and finally, to effect draining of the cooking chamber when the pump's delivery pressure is removed, as by turning off or failure of the pump. Alternatively, a number of inlet and/or drain conduits may be provided having a corresponding plurality of control valves therein which govern the particular function of the conduit in question. As a practical matter, it is highly desirable to be able to drain the hot cooking oil from the chamber 20 as desired, and especially automatically upon a failure of the pump 12. Draining of the cooking oil will, of course, prevent any unwanted over-cooking or even possible burning of the food.

An outlet conduit 22 leads from the cooking chamber 20 and contains a pressure gauge and in this case, an associated control valve 24. The pressure gauge is of a conventional type, while the control valve 24 is preferably of a simple plunger or piston type, of a selected weight in order to regulate the pressure within the cooking chamber 20 at a predetermined value. In other words, the weight of the plunger in pressure control valve 24 is such that it will regulate and maintain the pressure within cooking chamber 20 at a corresponding predetermined value. As indicated above, cooking chamber 20 is pressurizeable in order to promote a quicker and more thorough cooking of the food. A conventional pressure release valve (not shown) may also be provided for normal safety purposes. The outlet conduit 22 leads through a strainer 26 to an exhaust chamber 28. This exhaust chamber 28 has an associated vent 30 for discharging or venting to atmosphere any vapor, odors, and steam which may have been expelled by the cooking food. This vapors may have been absorbed into the pressurized cooking liquid in the cooking chamber 20. Since the exhaust chamber 28 is vented to atmosphere, conditions of atmospheric pressure exist above any liquid contained therein. As a result, the vapors and steam previously mentioned will easily be released from the pressurized liquid within chamber 28.

The multi-way control valve 16 also has a drain conduit 32 associated with it, which also connects with the exhaust chamber 28. In this way, cooking liquid from the chamber 20 can be drained to empty the latter. A by-pass conduit line 34 and a by-pass control valve 36 are further associated with the multi-way control valve 16. The conduit 34 and control valve 36 serve to relieve back-pressure on the biasing springs within control valve 16. This enables the control valve 16 to operate more easily, e.g., in becoming conditioned or set for draining of the cooking liquid from the chamber 20. Furthermore, it is preferable in operating the pump 12 not to allow pressure to build up to the maximum that can be delivered by the pump. In this respect, the pump 12 is usually provided with a by-pass flow control built into the same. That flow control valve is adjusted to provide the delivery pressure wanted, say, in the multi-way valve 16.

From the exhaust chamber 28, a return conduit 38 leads through a filter housing 40 and a rotatable filter assembly (described in the embodiments of FIGS. 2, 4 and 5) to a conduit 42 and the fat fryer 10. These embodiments will be described in more detail below. In any event, the filter assembly operates to effect continuous filtering of the cooking liquid (hot fat or oil) to remove contaminating foodstuff materials therefrom before the liquid is reheated in the fat fryer 10 for re-use. Preferably, an additional pump 44 is provided in the conduit 38 to pump cooking liquid from the exhaust chamber 28 and under some pressure through the filter housing 40 and filter assembly therein, and by the conduit 42 to the fat fryer 10. As will be further explained below, the filter assembly is spun to clean the same, so that centrifugal forces are generated acting on the filtered particles to remove them from the filter surface. As a result, the quality and purity of the cooking liquid can be maintained at a high level at all times.

Although the filter housing 40 (and filter assembly contained therein) is shown in FIG. 1 as being spaced apart from the fat fryer 10, the former may be mounted directly thereon, or connected to the bottom of exhaust chamber 28. In FIG. 1, the fat fryer 10 is of conventional design and construction, although a custom-built tank with heating means incorporated therein could also be used. It should be noted here that the fat fryer 10, all conduits and piping, and other elements described above will preferably be of stainless steel, or other equivalent material approved by the Food and Drug Authorities for use in cooking apparatus. In any event, the elements will be of a material substantially inert and non-corrodable relative to the food and hot cooking liquid, and not toxic.

In using the apparatus shown in FIG. 1, cooking liquid is initially heated in the fat fryer 10 normally to a temperature of approximately 300° to 400° F. Reference should again be had to my above-mentioned C-I-P application Ser. No. 58,951. The food to be cooked is then placed on suitable trays or racks for insertion into the cooking chamber 20. The latter is in this case closed and sealed tight to withhold the cooking pressure which is in excess of normal atmospheric pressure, for example, from the 10 to 20 psig mentioned earlier. A master switch and timer will now be activated and the pump 12 started. The pump's delivery pressure causes the multi-way control valve 16 to open and allow the cooking chamber 20 to fill with hot cooking liquid. Due to some minor heat losses and the heat absorbed by the "charge" of food to be cooked, the temperature within the cooking chamber during cooking will normally be some selected value from about 250° to 300° F. The pressure control valve 24 controls and maintains the pressure within cooking chamber 20 at the desired value. As the chamber 20 fills up with cooking liquid and the pressure therein starts to build up, the multi-way control valve 16 will re-adjust in response to higher back pressure in the chamber 20 and provide a selected low-flow rate of hot cooking liquid into the chamber 20. This low-flow rate of cooking liquid circulates continuously through the cooking chamber 20 and maintains the temperature uniformly throughout the same. Any vapor or steam being generated from the natural juices or water in the food being cooked forms a vapor cushion at the top of the cooking chamber 20. This provides at least some of the greater-than-atmospheric cooking pressure in the chamber 20. It is to be noted, however, that the pump 12 delivers liquid at a pressure greater than that required in the cooking chamber 20.

As the hot cooking liquid comes into contact with the flour-and/or bread-coated pieces of food, some of the latter is often dislodged and picked up by the liquid. Also, some particles of raw food which may have fallen off during handling will also be picked up by the liquid. Such flour and food particles constitute contaminating foodstuff material in the cooking liquid and unless removed, contribute to rapid deterioration of that liquid. Moreover, irrespective of whether it is cooked, partly cooked or uncooked, the removal of such material from the liquid is required to allow processes of cooking good quality food.

As mentioned above, none of the prior art arrangements current known will operate satisfactorily under the conditions encountered in continuous or batch-type processes of cooking food, especially in large volumes and as regards the removal of partly cooked or uncooked foodstuff materials from the cooking oil or fat. In distinct contrast to that, I have repeatedly used the filter apparatus of this invention for continuously and efficiently filtering such contaminating material from hot cooking fat or oil. The quality of the cooking liquid has been maintained high for long periods of time and through continued re-use. Moreover, by eliminating the use of brushes or scrapers as found in some prior art filters (see U.S. Pat. No. 651,621 — Black et al.) a long working life of the filter medium was possible. By providing a filter assembly that is rotatable, I have been able to clean the same centrifugally. Such a cleansing action is effective and easy to carry out, and I have also found that is preferable to provide an auxiliary cleansing action caused by generating turbulence in the liquid immediately adjacent the filter surface. In all instances, I have been able to clean the filter assembly easily and effectively, with only a minimal loss or extraction of cooking liquid from the overall system being incurred each time the filter assembly is cleaned. I have found that by using a filter medium comprising a cloth woven from strands of a fluorinated ethylene or propylene resin, a silicone-based thermosetting resin, or the like; a wire screen whose wires are substantially wholly coated with such a material; or strands or fibers of such materials pressed into a felt-like mat structure, satisfactory performance was achieved under the conditions encountered in the cooking apparatus of FIG. 1, described above. The non-sticking and low-friction properties of these materials, or other equivalents thereto, enables the same to be effectively used in the present filter assembly to efficiently remove cooked and especially partly cooked or uncooked foodstuff materials from hot cooking liquid.

Figure 2:
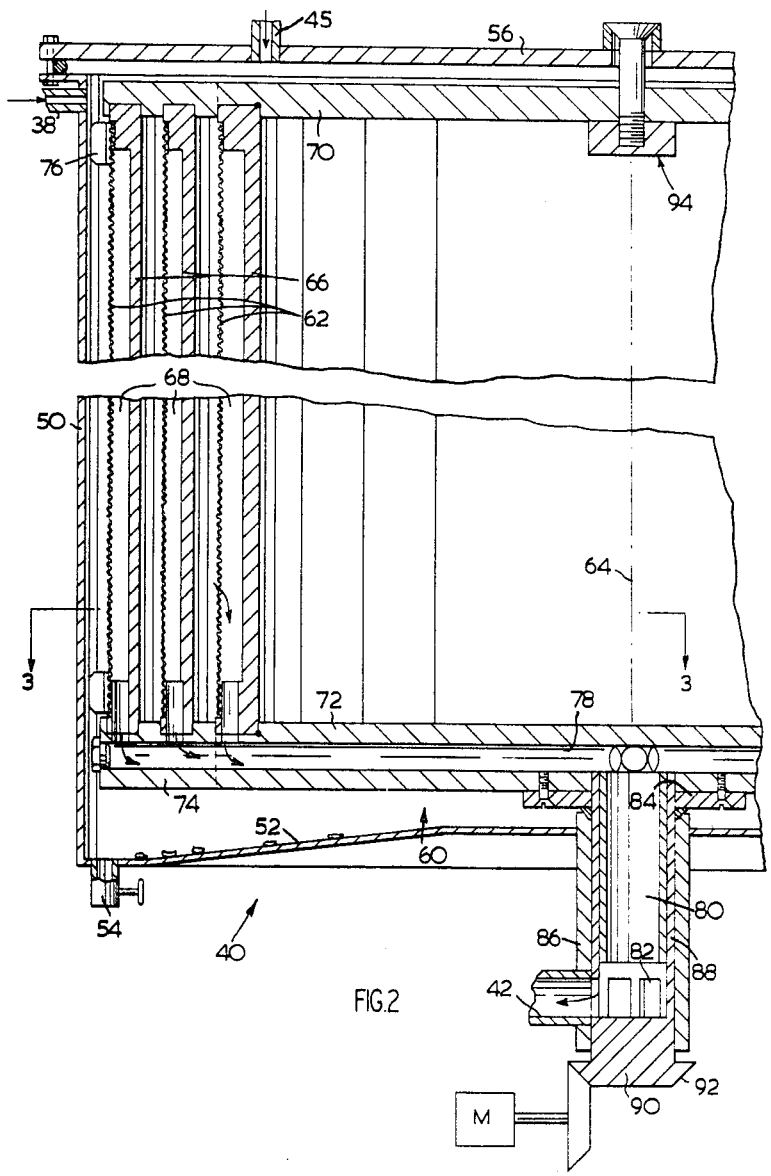
FIG. 2 is an elevation view taken in central section, showing part of one embodiment of a filter assembly according to the present invention, as adapted for use in the apparatus of FIG. 1.
Figure 3:
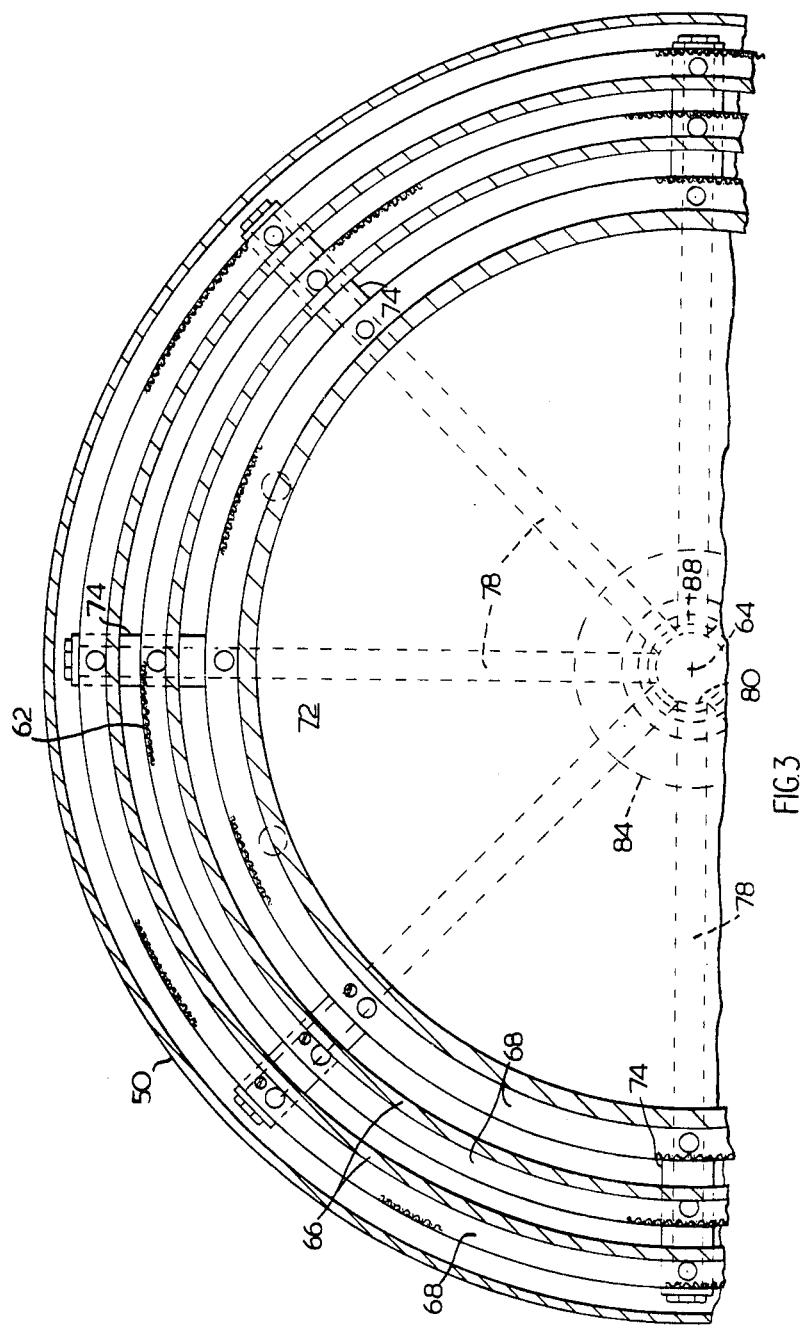
FIG. 3 is a plan view taken along line 3—3 of FIG. 2.

With reference now to FIGS. 2 and 3, one form of the present filter assembly will be described in detail. There, the filter housing 40 is seen to include side walls 50 and a bottom wall 52. The lowest point in the bottom 52 of the filter housing 40 occurs towards the outer periphery thereof and a drain tap 54 is provided in that area. A removable coverplate 56 serves to close the top of the filter housing 40 as shown. In the particular instance shown here, the filter housing 40 is separate from either the exhaust chamber 28 or fat fryer 10 (of FIG. 1) and hence, the conduit 38 is connected to the filter housing to convey liquid to the same. As seen from FIG. 1, the filter housing 40 is also connected to the upper portion of the exhaust chamber 28 by means of a by-pass line 45 in which a check valve 47 is provided. This check valve preferably has an apertured butterfly therein to allow a small continuous flow of liquid therethrough. This line 45 also serves as a vacuum breaker when the filter housing 40 is drained. The apertured butterfly in check valve 47 allows steam or other vapors which might still be contained in the liquid flowing into the filter housing 40 to be removed therefrom. Hence an unwanted buildup of steam within the filter housing is avoided. Such a buildup of steam is undesirable as it would reduce the operating efficiency of the filter assembly.

The present filter assembly is shown overall in FIG. 2 at 60 and in this particular instance, comprises three filter surfaces 62 symmetrically disposed (see FIG. 3) about an axis of rotation 64. Three corresponding impervious cylindrical tubes 66 are spaced inwardly from each of the filter surfaces 62 and cooperate with the latter to form receiving chambers 68 for the filtered liquid. The filter surfaces 62 and the impervious tubes 66 are in spaced-apart relation being supported by top and bottom disc elements 70 and 72. More particularly, each of the discs 70 and 72 is provided with radially extending arms 74 which are suitable formed to support the filter surface and impervious tubes fixedly relative thereto. A metal band 76 or the like can be used to secure the filter medium (and any backing surface in the form of perforated sheet metal which might be used therewith where needed), to its related impervious tube 66. In the particular embodiment of FIGS. 2 and 3, the lower disc element 72 is provided with a number of radially extending bore holes 78 that are in fluid-flow communication with each of the receiving chambers 68. In addition, the bore holes 78 connect to a discharge tube 80 and discharge ports 82 which lead directly to the conduit 42. In that way, filtered liquid can be conveyed from the receiving chambers 68 back to the fat fryer 10 for reheating and re-use.

In the particular arrangement of FIG. 2, the bottom disc element 72 is fixedly secured to a plate 84 which is welded to discharge tube 80. A bearing sleeve 86 is provided interiorly thereof with an insert 88 having low friction properties, with that insert surrounding the discharge tube 80. By means of a splined or keyed connection, the discharge tube 80 is operatively connected to a plug assembly 90 in which the discharge ports 82 are provided, and on which a bevel gear 92 is also provided, exteriorly of the support sleeve 86. This bevel gear 92 is adapted to be coupled to a driving motor which can be selectively operated to rotate the filter assembly 60 when desired. It should be noted that the support sleeve 86 is fixedly connected to the filter housing 40 which is itself securely supported. As also seen in FIG. 2, the top disc element 70 is provided with means 94 which provides support against lateral movement of the filter assembly 60 when the same is being rotated. In some instances, it may be possible to eliminate the upper support bearing 94, although dynamic unbalance of the filter assembly 60 together with an uneven deposition of contaminating material on the filter surfaces 62 could contribute to unbalance and excessive wear of the lower rotatable support structure in that situation.

The filter housing 40 and filter assembly 60 of FIGS. 2 and 3 are shown to be circular in cross section. This is probably the easiest shape to manufacture, although other configurations that preferably are symmetrical about the axis 64 could also be used. It will be apparent that since cleaning of the filter assembly 60 takes place by centrifugal forces, a circular configuration would in all likelihood be most efficient.

Figure 4:
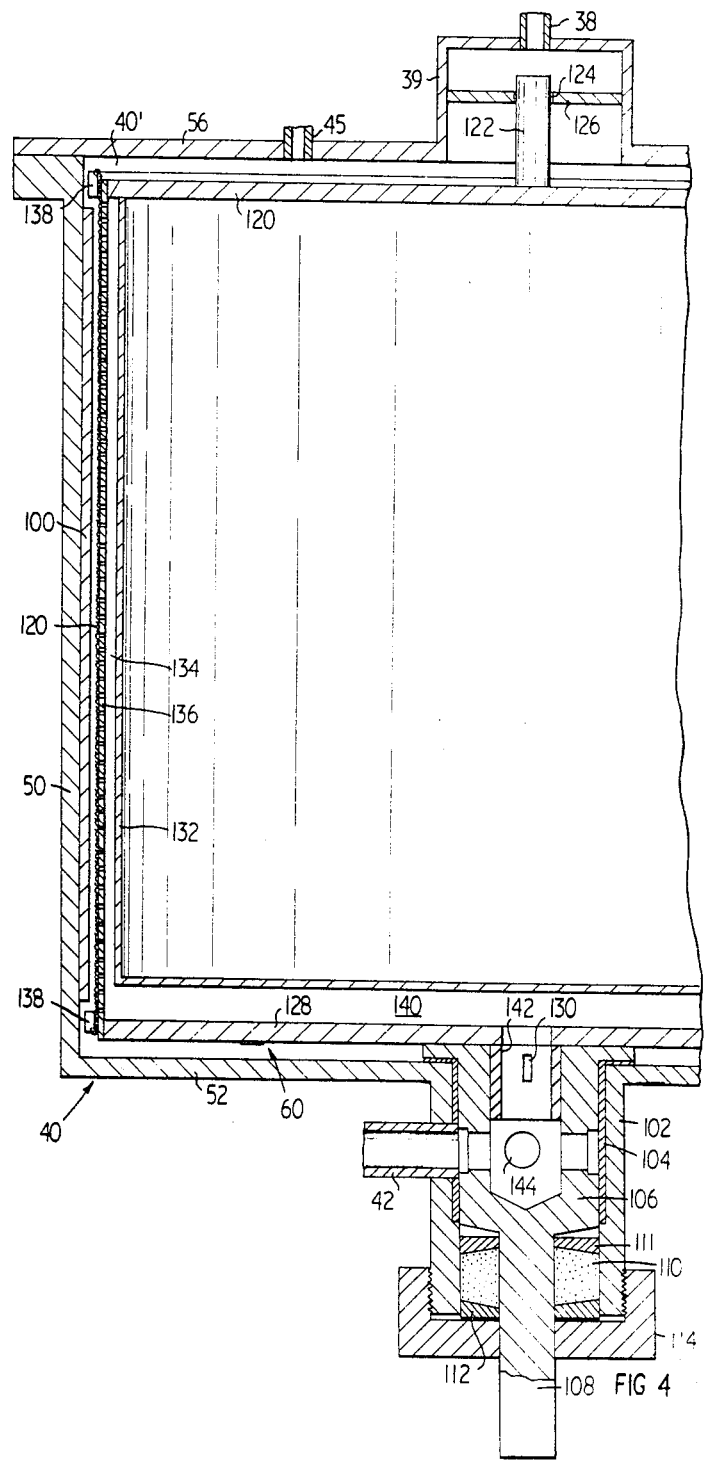
FIGS. 4 and 5 are elevation views taken in central section, showing additional embodiments of a filter assembly according to the present invention, again as adapted for use in the apparatus of FIG. 1.
Figure 5:
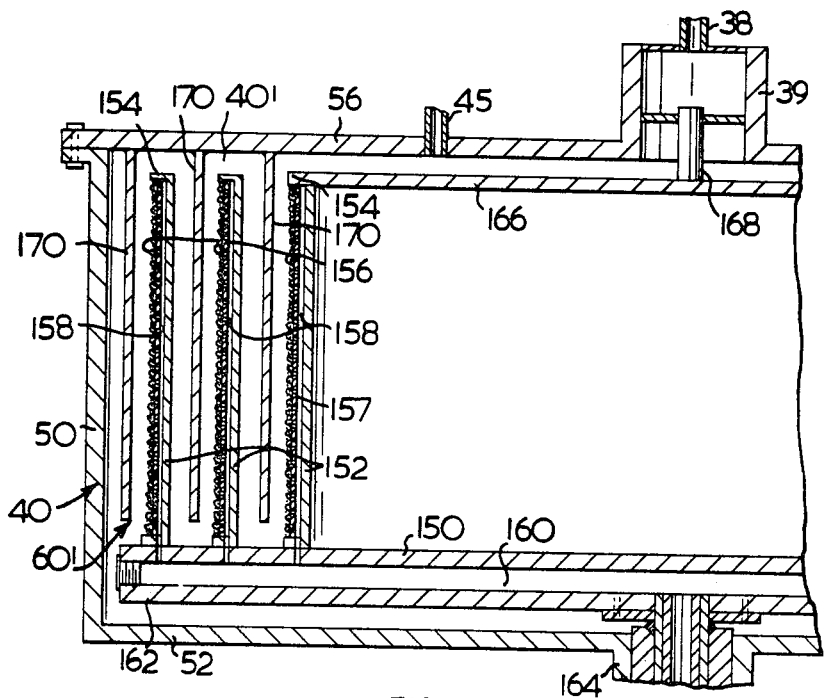

Two other embodiments of a filter assembly encompassed by the present invention are shown in FIGS. 4 and 5. In FIG. 4, there is shown the filter housing 40 made preferably of stainless steel and comprising a filter reservoir 40' that is connected by the conduit 38 and an inlet port 39 to the exhaust chamber 28 (of FIG. 1). The reservoir 40' has side and bottom walls 50 and 52, and a removable top cover 56 to which the inlet port 39 is connected by welding or the like. The top cover 56 is sealably attached to the top edges of side walls 50, but removable to allow maintenance of the filter assembly 60. To this end, suitable clamps or screw fasteners (not shown) can be used. The return by-pass line 45 of FIG. 1 connects the filter reservoir 40' to the exhaust chamber 28 and as stated previously, a check valve is also provided in that conduit line. By using an aperture in the butterfly of that check valve, the pressure from pump 44 will return a small flow of cooking liquid back to the exhaust chamber 28. In so doing, any steam or other vapors which may still remain in a liquid flowing into the filter reservoir 40' will not be allowed to build up within the filter housing 40 and thus reduce the operating efficiency of the filter assembly. In accordance with a preferred embodiment of the present invention, at least one turbulence-generating means in the form of a bar 100 is provided, being secured to the side walls of the filter housing 40. These turbulence bars are preferably rectangular or square in cross section, and their function will become apparent from the description below.

The bottom 52 of filter housing 40 is apertured centrally and axially thereof and a tubular bearing sleeve 102 is connected to that aperture. A bushing 104 is provided interiorly of the sleeve 102 to closely receive an enlarged head portion 106 of a pulley shaft 108. The bushing 104 is preferably made of "TEFLON" a registered trademark of Dupont for tetrafluoroethylene. The pulley shaft 108 is adapted to be coupled through gear means or a belt and pulley arrangement (not shown) to a suitable source of power to enable selected rotation of the pulley shaft and filter assembly 60 when desired. A fixed packing ring 111 is secured interiorly of the sleeve 102, on one side of a packing 110 that is also preferably of "TEFLON," while a packing washer 112 is on the other side of that packing. A nut 114 is centrally apertured to allow the pulley shaft 108 to extend therethrough, and is in threaded engagement with the lower end of bearing sleeve 102 to secure the packing firmly in place.

It should be noted that the bottom of the filter housing 40 was shown in FIG. 1 to be dished so that the lowest point occurred generally near the side walls thereof, while in FIG. 4 the bottom wall is relatively flat. As stated previously, various configurations can be used.

The filter assembly 60 comprises a circular top disc element 120 to which a cylindrical support rod 122 is fixedly secured, concentrically thereof. This support rod 122 is closed received within a centrally aligned opening 124 in a strap 126 that is welded at both ends to the inlet port 39. Accordingly, the flow of liquid into the filter reservoir 40' will be through the conduit line 38 and down through the inlet port 39 from where the spreads generally radially outwardly to the peripheral regions of the filter housing 40. A circular bottom disc element 128 is rigidly secured by means of a key and keyway arrangement 130 to the enlarged head portion 106 of the drive shaft 108. A cylindrical tube 132 that is impervious to the cooking liquid is sealably connected to and supported by the upper disc element 120. This cylindrical tube 132 is slightly smaller diametrically than either of the disc elements 120 or 128 so as to be spaced inwardly of the filter medium 120 to cooperate therewith for defining a receiving chamber 134 for filtered liquid. The filter medium is usually supported against a backing surface 136 which is preferably of perforated sheet metal and which serves to give structural rigidity to the filter medium. This is especially the case when the filter medium is either a cloth or felt-like mat structure. In either instance, the filter medium 120 is secured by bands 138 to the outer periphery of the top and bottom disc elements 120 and 128. It is to be recognized from FIG. 4 that the cylindrical tube 132 is in effect suspended from the top disc element 120, thus forming a discharge space or header 140 immediately above the bottom disc element 128. This bottom disc element 128 is apertured centrally thereof, as shown, so that the discharge header 140 is in fluid communication with a discharge outlet 142 and discharge ports 144 that lead to the conduit 142 which carries the filtered cooking liquid back to the fat fryer 10 (of FIG. 1). From the foregoing, it will be seen that the top and bottom disc elements 120 and 128, as well as the impervious surface 132 and the filter medium 120 are rotatably supported within the filter housing 40 by means of the lower bearing arrangement and also by the upper cylindrical support rod 122. Such a configuration affords one method of rotatably supporting the filter assembly and simultaneously allows for the discharge of filtered liquid from the lower central portion thereof.

FIG. 5 shows another embodiment of a filter assembly according to the present invention which combines some of the structural features found in the embodiments previously described. In particular, a filter housing is again shown at 40 and hot cooking liquid is conducted therethrough from the exhaust chamber 28 (of FIG. 1) through conduit line 38 and inlet port 39. As before, the filter reservoir is closed by a removable coverplate 56 to which the inlet port 39 is connected. Also as before, a by-pass conduit line 45 connects the filter reservoir 40' through a check valve (not shown) to the exhaust chamber 28 of FIG. 1. The filter assembly shown at 60' comprises a lower disc element 150 to which three impervious cylindrical tubes 152 are fixedly secured. The open ends of these cylindrical tubes 152 are provided with radially outwardly extending flanges 154 which support a corresponding series of filter surfaces 156 (and backing plates 157). As will be seen from FIG. 5, the filter surfaces 156 and impervious tubes 152 are disposed in spaced apart relation to cooperate in forming a series of receiving chambers 158 for filtered liquid. It will also be seen that the bottom disc element 150 can be constructed so as to be essentially identical to the disc element shown at 72 in FIGS. 2 and 3. In other words, the disc element 150 is provided with bore holes 160 which extend radially of the body of the disc element, as well as through radially extending arm portions 162. This is similar to the arrangement shown for the bottom disc 72 in FIGS. 2 and 3. As indicated previously, the arm portions 162 will again in this instance serve to support the filter surfaces 156 and impervious tubes 152. Connecting channels are provided to interconnect the receiving chambers 158 with the bore holes 160 so that filtered liquid can be conveyed therefrom. The bottom disc element 150 is also rotatably supported within a supporting sleeve 164 which is fixedly secured to the filter housing 40. FIG. 5 illustrates schematically a method for rotatably supporting the filter assembly 60' in a manner which is basically identical to that described above in connection with FIGS. 2 and 3. Other arrangements could also be used, such as that described in the embodiment of FIG. 4. Once again, the innermost impervious tube 152 has a top cover shown at 166 to which the upper support means shown overall at 168 is fixedly secured. This support arrangement is similar to that of FIG. 4. Note that in all instances the closed inner impervious tube will minimize the volume of cooking oil required to fill the filter reservoir.

In FIG. 5, a plurality of turbulence-generating bars 170 are suspended within the filter housing 40 from the top coverplate 56, adjacent to each of the filter surfaces 156. Although it is not apparent from this figure, the turbulence bars 170 can be positioned at various angular locations, taken in plan view, for example at 90° or 60° intervals.

It is to be recognized that in each of the embodiments shown in FIGS. 2, 4 and 5, the functioning and cleaning of the filter assembly is basically identical. In each instance, hot cooking liquid which invariably contains some contaminating foodstuff materials (either cooked, partly cooked, or uncooked) is conveyed from the cooking chamber 20 of FIG. 1 through the exhaust chamber 28 and by means of the conduit 38 into the filter reservoir defined by filter housing 40. In FIG. 2, the hot cooking liquid which contains contaminating materials is introduced into the filter reservoir adjacent the outer periphery thereof, while in the embodiment of FIGS. 4 and 5, introduction of the hot cooking liquid takes place generally centrally of the filter reservoir. In any case, passage of the cooking liquid through the filter reservoir will involve passing through the filter medium and into the receiving chamber. From the receiving chamber, the filtered liquid is then conducted away by means of suitable conduits provided either integral with, or carried by the bottom disc element. Because the filter assembly is rotatably supported with the filter housing 40, discharge of the filtered cooking liquid will take place at a location generally coaxially of the rotatable filter assembly. In the present embodiments, the discharge passageways have been shown as being part of the support means which includes bearings for rotatably supporting the filter assembly. With such an arrangement, flow through the filter housing 40 can be though of as being generally from top to bottom. In other instances, that direction could be reversed, that is to say, hot cooking liquid to be filtered could be pumped into the bottom of the filter housing 40, pass through the filter medium and be discharged by suitable outlet conduits built into the upper support bearing for rotatable filter assembly. This would appear to be somewhat a matter of choice.

I have constructed and successfully used filter assemblies such as those described above, to efficiently remove contaminating foodstuff from the cooking oil used in the apparatus of FIG. 1. Filter assemblies constructed according to the present invention have been particularly effective in filtering partly cooked and uncooked material from the hot cooking oil. Moreover, such filter assemblies were easily and quickly cleaned. In some experiments, bars were used to generate turbulence that complemented the centrifugal cleaning action, while in others only spinning was used to clean the filter medium. Although it is not essential, I have found that the small amount of backflushing which occurs by starting spinning of the filter assembly while the filter reservoir and hence receiving chambers are full of cooking oil is useful in achieving a more efficient cleansing action. That is to say, no draining of the filter reservoir takes place until spinning has at least started. Accordingly, I have found that the best results are obtained if both turbulence and backflushing are used to provide an auxiliary cleansing action. The primary cleansing action still remains due to centrifugal forces developed by spinning the filter assembly. In other words, even though cleaning of the present filter assembly occurs due only to spinning the same, it is preferable to also use turbulence and/or backflushing for satisfactory cleaning.

The following table indicates the configurations and conditions under which successful experiments were carried out using the present invention, in the apparatus of FIG. 1:

from the filter reservoir. Rotation of the filter assembly generates centrifugal forces which cause contaminating material to be spun off of the filter surfaces and into the draining liquid, thereby flushing the same out of the system. Because the filter reservoir was initially full of cooking oil or fat, so too were the receiving chambers in the filter assembly. Hence, when cooking oil begins to drain from the filter reservoir, the filtered cooking liquid in the receiving chambers will cause some degree of backflushing of the filter surfaces as it too drains by gravity. In the embodiments of FIGS. 4 and 5,

| Configu-ration | Cooking chamber | | | Filter (11 inches high) | | | | | Reservoir | |
|---|---|---|---|---|---|---|---|---|---|---|
| | Press. (p.s.i.g.) | Time (min.) | Temp. (° F.) | Diameter (in.) | Material | Thread count (in.) | Spin rate (r.p.m.) | Time of spin (sec.) | Turbulence bars | Liquid level in reservior |
| Figure 2 | 9 | 12 | 250° to 300° | 12, 10¾, 9½ | Teflon multifilament fabric | 54×40 | 431 | 15 | None | Full. |
| Figure 4 | 9 | 12 | 250° to 300° | 11 | Teflon monofilament fabric | 92×90 | 431 | 15 | 1 | Do. |

NOTE.—Each time spinning occurred, pump(s) were off. All experiments done in cooking chicken dipped in "wash" solution and coated with spiced flour.

As contaminating material is filtered out of the cooking liquid, it accumulates on the filter surfaces. It will therefore be necessary to ensure that the area of the filter surface is sufficient to permit the anticipated accumulation of contaminating material thereon during the cooking cycle or operation, without causing an unsafe or unwanted rise in pressure in the system. The minimum surface area required for any particular kind of cooking process can readily be determined by a few brief experiments. In many instances, moreover, it will be recognized by those skilled in this art that where breadcrumbs or cornmeal, say, is being used as the coating material for the food to be cooked, the amount of contaminating material likely to be picked up by the cooking liquid can be expected to be more severe than in those instances where spiced flour is being used as the coating material. Since pressure-sensitive cut-off switches can be provided to govern the operation of the pumps in the cooking apparatus, experiments can be carried out safely and relatively quickly. In any event, once the manufacturer has determined what the minimum surface areas are for filtering in connection with cooking any given food product, there remains little for the consumer or or person using his equipment to do, other than to follow the manufacturer's instructions as to what configuration and minimum surface area is recommended for any given situation.

As mentioned above, using three impervious tubes and a maximum diameter of 12 inches, spinning at about 430 rpm, generated centrifugal forces that were sufficient to clean the filter surfaces easily and without leaving any significant baked-on deposits of contaminating material. In other configurations where the filter surfaces are disposed at greater distances from the axis of rotation, spin rates can be lower than the 430 rpm just mentioned. Similarly, using a smaller distance from the axis of rotation would require a somewhat higher rotational speed in order to generate the centrifugal forces required to adequately clean the filter surface. Many such radius and spin-rate combinations are possible. Again, a few brief experiments will quickly tell whether or not the spin-rate is adequate for the particular configuration being used.

When the filter assembly is to be cleaned, the filter pump in the cooking apparatus is turned off. It is preferable for maximum efficiency in the operation of the present filter assembly, to leave the filter reservoir full of cooking liquid at the start of spinning the filter assembly. Although it is not shown in FIGS. 4 and 5, a drain tap is also provided in those embodiments, and this can be opened either simultaneously with or shortly after starting rotation of the filter assembly. It will be recognized that as the filter assembly rotates, some of the liquid will also begin to spin, being dragged along by the filter assembly due to friction with the cooking liquid in the filter reservoir. In the configuration shown in FIGS. 2 and 3, when the drain tap 54 is opened, cooking liquid will begin to drain the cooking liquid being dragged along by the rotating filter assembly will encounter the fixed turbulence bars. Turbulence will therefore be generated within the cooking liquid, and because the bars are disposed adjacent the surface of the filter medium, that turbulence will tend to loosen contaminated material on the filter medium and effect an auxiliary cleansing action on the filter surface. It should be noted that draining of all liquid from the filter reservoir would not involve a loss of more than, say, a quart or two of liquid from a system which contains anywhere from about 40 to 50 gallons of liquid, and upwards, depending upon the size of cooking operation involved.

As mentioned earlier in this description, rather specific environmental conditions are encountered when cooking foods in hot fat or oil. In part, unusual conditions are encountered because of the presence of partly cooked or uncooked foodstuff materials which may be contained in that cooking oil and which tend to bake onto the filter surface due to the heat. I have found that by using cloth woven from strands or fibers of a fluorinated ethylene or propylene resin satisfactory performance of the filter assembly has been achieved both from the point of view of the filtering operation and for easy cleaning. Moreover, I have found that it is possible to use a felt-like mat structure made from strands or fibers of the same material. Alternatively, it is expected that the silicone-based theremosetting resins or other compositions having similar non-sticking and low friction properties at the temperatures mentioned herein, would also prove satisfactory.

From experiments to date, I prefer to use a fabric woven of monofilament fibers of "TEFLON" having a thickness of 0.0099 inches, and a porosity in cubic feet of 716.3. This cloth material has a weight of 6.47 ounces per square yard and a thread count of 92 by 90 per square inch. This cloth was supported against a backing plate of perforated sheet metal, on a drum having a diameter of about 11 inches. For fast, efficient cleaning of this filter cloth it was necessary in this particular embodiment to use turbulence bars. In other words, the embodiment shown in FIG. 4 is preferred for use with cloth woven from monofilament fibers of "TEFLON." The filter assembly was spun at about 430 rpm for approximately 15 seconds. When rotation of the filter assembly was started, the filter reservoir was full of cooking oil and hence some degree of backflushing also occurred when oil drained out of the reservoir.

Another material that I have used is "TEFLON" multifilament fabric or cloth. This cloth had a porosity in cubic feet of 178, was 0.0144 inches thick and had a weight of 10.63 oz. per square yard. A filter constructed according to the arrangement of FIG. 2 performed satisfactorily in filtering material from the hot cooking liquid. Even more importantly, spinning the filter assembly efficiently cleaned the filter surfaces of the contaminating material. If filtering of very fine materials or particles was wanted, a large filter surface constructed as shown in FIG. 5, could be used. With a porosity in cubic feet of 349.6 and a thread count of 168 × 108 per square inch, a "-TEFLON" monofilament fabric would give good results. It will be evident that when filtering of finer materials is wanted, a larger filter surface will be used, to accommodate the larger accumulation of filtered material.

The foregoing description relates to several embodiments of filter apparatus constructed according to the present invention. Other embodiments and variations will be obvious to those skilled in this art. It is intended to encompass all such variations and embodiments within the spirit of this invention, as defined by the claims below.

I claim:

1. Filter apparatus adapted to remove contaminating material from hot cooking liquid in a system of cooking food, comprising:
   a filter medium maintained at rest during filtering of said contaminating material from the cooking liquid;
   an annular member impervious to said liquid spaced inwardly of the filter medium to an axis;
   a top and bottom disc means for supporting the filter medium and impervious annular member, said filter medium and annular member being disposed in spaced apart relation to define with said disc means a closed receiving chamber for filtered liquid;
   conduit means carried by said bottom disc means for conveying the filtered liquid from the receiving chamber; and
   support means including bearing means, for rotatably supporting the disc means, filter medium and impervious annular member, the support means being adapted to be selectively driven for rotating the filter medium about said axis for a short period of time relative to the operating time of said system for cooking food, such rotation enabling centrifugal forces to be developed which cause the contaminating material to be cleaned from the filter medium.

2. The apparatus of claim 1 wherein a plurality of filter medium and impervious annular members are provided to form a corresponding plurality of closed receiving chambers, said conduit means being in communication with each of the receiving chambers for enabling filtered liquid to be conducted therefrom.

3. The apparatus of claim 1, wherein the bottom disc means is provided with channels internally thereof constituting said conduit means for conveying filtered liquid from said receiving chamber.

4. The apparatus of claim 1, wherein turbulence generating means are provided adjacent and exteriorly of the filter medium, said turbulence generating means being fixedly supported and operable to generate turbulence in the liquid when the filter medium is rotated, such turbulence tending to loosen the contaminating material collected on the filter medium and effect an auxiliary cleansing action thereof.

5. The apparatus of claim 4, wherein a plurality of filter medium and impervious annular members are provided with said turbulence generating means being disposed adjacent at least the outermost filter medium, taken relative to said axis of rotation.

6. The filter apparatus of claim 1, wherein said conduit means are formed integrally of the bottom disc means.

7. The apparatus of claim 1, wherein the filter medium comprises a cloth woven from monofilament fibers of tetrafluoroethylene to a thread count of about 92 by 90 per square inch.

8. The apparatus of claim 7, wherein turbulence-generating means are provided adjacent the filter medium whereby turbulence generated in the cooking liquid when the filter apparatus is rotated causes an auxiliary cleansing action on said filter medium.

9. The apparatus of claim 1, wherein the filter medium comprises a cloth woven from strands of a fluorinated ethylene resin.

10. The apparatus of claim 1, wherein the filter medium comprises a cloth woven from strands of a fluorinated propylene resin.

11. The apparatus of claim 1, wherein the filter medium comprises a felt-like mat structure made from fibers of materials having non-stick properties similar to that of a fluorinated ethylene resin.

12. The apparatus of claim 1, wherein the filter medium comprises a wire screen whose wires are coated with a material having non-stick properties similar to that of a fluorinated ethylene resin.

13. Filter apparatus suitable for removing contaminating material from hot cooking oil in a system of cooking food in said oil comprising:
   a filter surface in the form of a cloth woven from fibers selected from the group consisting of fluorinated ethylene and propylene resin, disposed symmetrically about an axis of rotation, said surface normally being at rest and being operable for filtering said material from the hot cooking oil;
   an annular member impervious to said liquid spaced inwardly of the filter surface relative to said axis;
   support elements in the form of top and bottom disc elements for supporting the filter surface and impervious annular member in spaced apart relation, said filter surface and annular member cooperating with said disc elements to define a closed receiving chamber for filtered cooking oil;
   conduit means carried by the bottom disc element and in communication with the receiving chamber for conveying the filtered oil therefrom; and,
   support means including bearing means, for rotatably supporting the filter surface, the annular member and the support elements, said support means being adapted to be selectively driven to effect periodic rotation of the filter surface about said axis, such rotation causing centrifugal forces to be generated which remove the filtered material from said filter surface, thereby enabling the latter to be cleaned centrifugally and otherwise left undisturbed.

14. The apparatus of claim 13, wherein turbulence generating means are provided adjacent the filter surface exteriorly thereof, the turbulence generating means being fixedly supported to cause turbulence in the cooking oil when the filter surface is rotating, whereby such turbulence tends to loosen the contaminating material collected on the filter surface and causes an auxiliary cleansing action on the same.

15. The apparatus of claim 13, wherein a plurality of filter surfaces and impervious annular members are provided, being supported by said disc elements in a manner forming a corresponding plurality of closed receiving chambers.

16. The apparatus of claim 15 wherein the innermost impervious annular member comprises a sealed cylinder that supports one filter surface and also minimizes the volume of cooking oil needed to fill a filter reservoir in which the filtering apparatus is housed.

* * * * *

UNITED STATES PATENT OFFICE
CERTIFICATE OF CORRECTION

Patent No. 3,667,613   Dated June 6, 1972

Inventor(s) Raymond H. Angold

It is certified that error appears in the above-identified patent and that said Letters Patent are hereby corrected as shown below:

Column 11, line 23, claim 1, line 7, should read -- of the filter medium relative to an axis --.

Signed and sealed this 7th day of November 1972.

(SEAL)
Attest:

EDWARD M. FLETCHER, JR.
Attesting Officer

ROBERT GOTTSCHALK
Commissioner of Patents